(12) United States Patent
Rastogi et al.

(10) Patent No.: US 6,247,016 B1
(45) Date of Patent: Jun. 12, 2001

(54) DECISION TREE CLASSIFIER WITH INTEGRATED BUILDING AND PRUNING PHASES

(75) Inventors: Rajeev Rastogi, New Providence; Kyuseok Shim, Bedminster, both of NJ (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/189,257

(22) Filed: Nov. 10, 1998

Related U.S. Application Data (60) Provisional application No. 60/097,570, filed on Aug. 24, 1998.

(51) Int. Cl.$^7$ ............................................. G06F 17/30
(52) U.S. Cl. ............................................. 707/101; 707/102
(58) Field of Search ................................. 707/100–103, 707/6

(56) References Cited

U.S. PATENT DOCUMENTS

| | | | |
|---|---|---|---|
| 4,719,571 | * 1/1988 | Rissanen et al. | 364/300 |
| 5,787,274 | 7/1998 | Agrawal et al. | 395/613 |
| 5,902,824 | * 5/1999 | Tzirkel-Hancock | 704/242 |
| 5,983,224 | * 11/1999 | Singh et al. | 707/6 |

OTHER PUBLICATIONS

J. R. Quinlan, *Simplifying Decision Trees,* 27 Intl. J. Man–Machine Stud. 221–234 (1987).

J. Ross Quinlan and Ronald L. Rivest, Inferring Decision Trees Using the Miniumum Description Length Principle, 80 Info. & Computation 227–248 (1989).

Rakesh Agrawal et al., An Interval Classifier for Database Mining Applications, Proc. 18 VLDB Conf. (1992).

Manish Mehta, MDL–based Decision Tree Pruning, Intl. Conf. on Knowledge Discovery Databases & Data Mining (1995).

John Shafer et al., Sprint: A Scalable Parallel Classifier for Data Mining, Proc. 22 VLDB Conf. (1996).

\* cited by examiner

*Primary Examiner*—Paul V. Kulik
(74) *Attorney, Agent, or Firm*—Synnestvedt & Lechner LLP (57) ABSTRACT

A method of data classification using a decision tree having nodes is disclosed, along with an apparatus for perming the method. Periodically or after a certain number of nodes of the tree are split, the partially built tree is pruned. During the building phase the minimum cost of subtrees rooted at leaf nodes that can still be expanded ("yet to be expanded nodes")is computed. With the computation of the minimum subtree cost at nodes, the nodes pruned are a subset of those that would have been pruned anyway during the pruning phase, and they are pruned while the tree is still being built.

17 Claims, 10 Drawing Sheets

```
PROCEDURE compute Cost&PrunePublic(Node N):
     /* S is the set of data records for N */
  1. If N is a "yet to be expanded" leaf return lower bound on subtree cost
     at N
  2. If N is a "pruned" or "expandable" leaf return (C(S) + 1)
     /* N₁ and N₂ are N's children */
  3. minCost₁ :=compute Cost&PrunePublic(N₁);
  4. minCost₂ :=compute Cost&PrunePublic(N₂);
  5. minCostₙ :=min{C(S) + 1, C_split(N) + 1 + minCost₁ + minCost₂};
  6. If minCostₙ = C(S) + 1{
  7.     Prune child nodes N₁ and N₂ from tree
  8.     Delete nodes N₁ and N₂ and all their descendants from Q
  9.     Mark node N as pruned
 10. }
 11. Return minCostₙ
```

FIG. 1

| Salary | Education | LABEL |
|--------|-----------|--------|
| $10,000 | High School | REJECT |
| $40,000 | Undergraduate | ACCEPT |
| $15,000 | Undergraduate | REJECT |
| $75,000 | Graduate | ACCEPT |
| $18,000 | Graduate | ACCEPT |

PROCEDURE build Tree(S):
1. Initialize root node using data set S
2. Initialize queue Q to contain root node
3. While Q is not empty do {
4.     Dequeue the first node N in Q
5.     If N is not pure {
6.         For each attribute A
7.             Evaluate splits on attribute A
8.         Use best split to split node N into $N_1$ and $N_2$
9.         append $N_1$ to $N_2$ to Q
10.     }
11. }

FIG. 4

PROCEDURE compute Cost&Prune(Node N):
    /* S is the set of data records for N */
1. If N is a leaf return (C(S) + 1
    /* $N_1$ and $N_2$ are N's children */
2. $minCost_1$ := compute Cost&Prune($N_1$);
3. $minCost_2$ := compute Cost&Prune($N_2$);
4. $minCost_N$ := min{C(S) + 1, $C_{split}$(N) + 1 + $minCost_1$ + $minCost_2$};
5. If $minCost_N$ = C(S) + 1
6.     Prune child nodes $N_1$ and $N_2$ from tree
7. Return $minCost_N$

FIG. 5

PROCEDURE compute Cost&PrunePublic(Node N):
   /* S is the set of data records for N */
1. If N is a "yet to be expanded" leaf return lower bound on subtree cost at N
2. If N is a "pruned" or "expandable" leaf return (C(S) + 1)
   /* $N_1$ and $N_2$ are N's children */
3. $minCost_1$ := compute Cost&PrunePublic($N_1$);
4. $minCost_2$ := compute Cost&PrunePublic($N_2$);
5. $minCost_N$ := min{C(S) + 1, $C_{split}$(N) + 1 + $minCost_1$ + $minCost_2$};
6. If $minCost_N$ = C(S) + 1{
7.    Prune child nodes $N_1$ and $N_2$ from tree
8.    Delete nodes $N_1$ and $N_2$ and all their descendants from Q
9.    Mark node N as pruned
10. }
11. Return $minCost_N$

FIG. 6

| Age | Car Type | LABEL |
|---|---|---|
| 16 | truck | HIGH |
| 24 | sports | HIGH |
| 32 | sports | MEDIUM |
| 34 | truck | LOW |
| 65 | family | LOW |

PROCEDURE compute MinCostS(Node N):

/* $n_1, \ldots, n_k$ are sorted in decreasing order */

1. If k = 1 return (C(S) + 1)
2. s := 1
3. $tmpCost := 2 * s + 1 + s * \log a + \sum_{i=s=2}^{k} n_i$
4. While s + 1 < k and $n_{s+2}$ > 2 + log a do {
5.     tmpCost := tmpCost + 2 + log a - $n_{s+2}$
6.     s + +
7. }
8. return min{C(S) + 1, tmpCost}

PROCEDURE compute MinCostV(Node N):
1. If k = 1 return (C(S) + 1)
2. Let array A contain the k classes in decreasing order of $n_i - V(S_i)$
3. s := 1
4. $tmpCost := minCost := 1 + \sum_{i=1}^{k} n_i$
5. While s < k do {
6.     tmpCost := tmpCost + 2 + log a - $n_{A[s]} - V(S_{A[s]})$)
7.     minCost := min{minCost, tmpCost - max{$n_{A[i]}$ : s + 1 ≤ i ≤ k}}
8.     s + +
9. }
10. return min{C(S) + 1, minCost}

FIG. 15

PROCEDURE compute MinCostV2(Node N):
1. If k = 1 return (C(S) + 1)
2. For i := 1 to k do {
3.     B[2*i-1] := $n_i - V(S_i)$
4.     B[2*i] := $V(S_i)$
5. }
6. Sort array B in decreasing order of B[i]
7. s := 1
8. $tmpCost := minCost := 1 + \sum_{i=1}^{k} n_i$
9. While s < 2 * k do {
10.     tmpCost := tmpCost + 2 + log a - B[s]
11.     minCost := min{minCost, tmpCost - B[s+1]}s + +}
12.     s + +
13. }
14. return min{C(S) + 1, minCost}

FIG. 16

DECISION TREE CLASSIFIER WITH INTEGRATED BUILDING AND PRUNING PHASES

This application is based on a Provisional Application, Ser. No. 60/097,570, filed on Aug. 24, 1998.

BACKGROUND OF THE INVENTION

1. Description of the Prior Art

The proliferation of computerized database management systems has resulted in the accumulation of large amounts of data by the users of such systems. To be able to use these huge storehouses of data to best advantage, a process called "data mining" has emerged. Data mining involves the development of tools that can extract patterns from the data and the utilization of the patterns to establish trends which can be analyzed and used.

Classification is an important aspect of data mining and involves the grouping of the data to make it easier to work with. U.S. Pat. No. 5,787,274 to Agrawal et al. provides extensive discussion of prior art classification methods used in data mining and is incorporated herein by reference.

Decision tree classification is the classification method of choice when time cost is an issue. As described in more detail below, prior art decision-tree classification methods utilize a two-phase process: a "building" phase and a "pruning" phase. In the building phase, a decision tree is built by recursively partitioning a training data set until all the records in a partition belong to the same class. For every partition, a new node is added to the decision tree. A partition in which all the records have identical class labels is not partitioned further, and the leaf corresponding to it is labeled with the class label. Those records that do not fall into the class of a particular node are passed off as a new branch until they fall within a subsequent class.

A number of algorithms for inducing decision trees have been proposed over the years. See, for example, L. Breiman, J. H. Friedman, R. A. Olshen, and C. J. Stone, *Classification and Regression Trees*, Wadsworth, Belmont, 1984; B. D. Ripley, *Pattern Recognition and Neural Networks*, Cambridge University Press, Cambridge, 1996; Manish Mehta, Rakesh Agrawal, and Jorma Rissanen, *SLIQ: A Fast Scalable Classifier For Data Mining*, In EDBT 96, Avignon, France, March 1996; J. R. Quinlan, *Induction of Decision Trees*, Machine Learning, 1:81–106, 1986; J. Ross Quinlan, *C4.5: Programs for Machine Learning*, Morgan Kaufman, 1993; B. D. Ripley, *Pattern Recognition and Neural Networks*, Cambridge University Press, Cambridge, 1996; J. Ross Quinlan, *C4.5: Programs for Machine Learning*, Morgan Kaufman, 1993; John Shafer, Rakesh Agrawal, and Manish Mehta, *SPRINT: A Scalable Parallel Classifier for Data Mining*, In Proc. of the VLDB Conference, Bombay, India, September 1996; all of which are incorporated herein by reference.

The building phase constructs a perfect tree (a tree that classifies, with precision, every record from the training set). However, one often achieves greater accuracy in the classification of new objects by using an imperfect, smaller decision tree rather than one which perfectly classifies all known records. The reason is that a decision tree which precisely classifies every record may be overly sensitive to statistical irregularities and idiosyncrasies of the training set. Thus, all of the prior art algorithms known to the applicant perform a pruning phase after the building phase in which nodes are iteratively pruned to prevent "overfitting" and to obtain a tree with higher accuracy.

For pruning, the Minimum Description Length ("MDL") principle (or other known pruning method) is applied to prune the tree built in the growing phase and make it more general. The MDL principle states that the "best" tree is the one that can be encoded using the fewest number of bits. Thus, under the MDL principle, during the pruning phase the subtree of the tree that can be encoded with the least number of bits is identified. The cost C (in bits) of communicating classes using a decision tree comprises (1) the bits to encode the structure of the tree itself, and (2) the number of bits needed to encode the classes of records in each leaf of the tree.

MDL pruning (1) leads to accurate trees for a wide range of data sets, (2) produces trees that are significantly smaller in size, and (3) is computationally efficient and does not use a separate data set for pruning. For the above reasons, the pruning algorithms of the present invention employ MDL pruning. A detailed explanation of MDL-based pruning can be found in *MDL-based Decision Tree Pruning*, Manish Mehta, Jorma Rissanen and Rakesh Agrawal, International Conference of Knowledge Discovery in Databases and Data Mining (KDD-95), Montreal, Canada, August 1995, incorporated herein by reference.

2. The Process of Decision-Tree Based Classification

To understand the present invention it is necessary to have a basic understanding of the process involved in building and pruning a decision tree. An initial data set comprises a group of sample records called the "training set" and is used to establish a model or description of each class, which model is then used to classify future records as they are input to the database.

Figure 1:
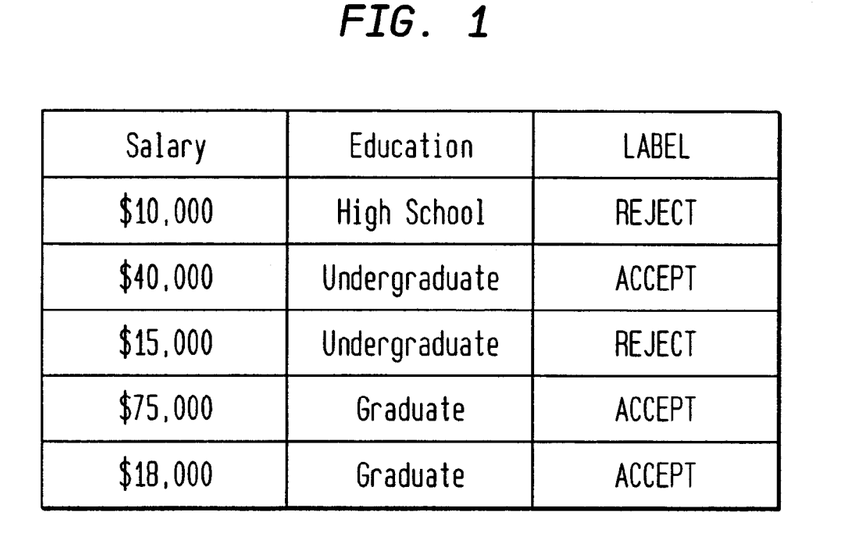
FIG. 1 is a table showing a sample training set of data.

Each sample record has multiple attributes and is identified or "tagged" with a special classifying attribute which indicates a class to which the record belongs. Attributes can be continuous (e.g., a series of numerical values which can be placed in chronological order and which can be grouped based on their numerical value) or categorical (a series of categorical values which can only be grouped based on their category). For example, as shown in FIG. 1, a training set might comprise sample records identifying the salary level (continuous attributes) and education level (categorical attributes) of a group of applicants for loan approval. In this example, each record is tagged with either an "accept" classifying attribute or a "reject" classifying attribute, depending upon the parameters for acceptance or rejection set by the user of the database. The goal of the classification step is to generate a concise and meaningful description for each class that can be used to classify subsequent records.

As shown in FIG. 1, there is a single record corresponding to each loan request, each of which is tagged with either the "accept" label if the loan request is approved or the "reject" label if the loan request is denied. Each record is characterized by each of the two attributes, salary (e.g., $10,000 per year) and education level completed (e.g. high-school, undergraduate, graduate).

1. Building Phase

Figure 2:
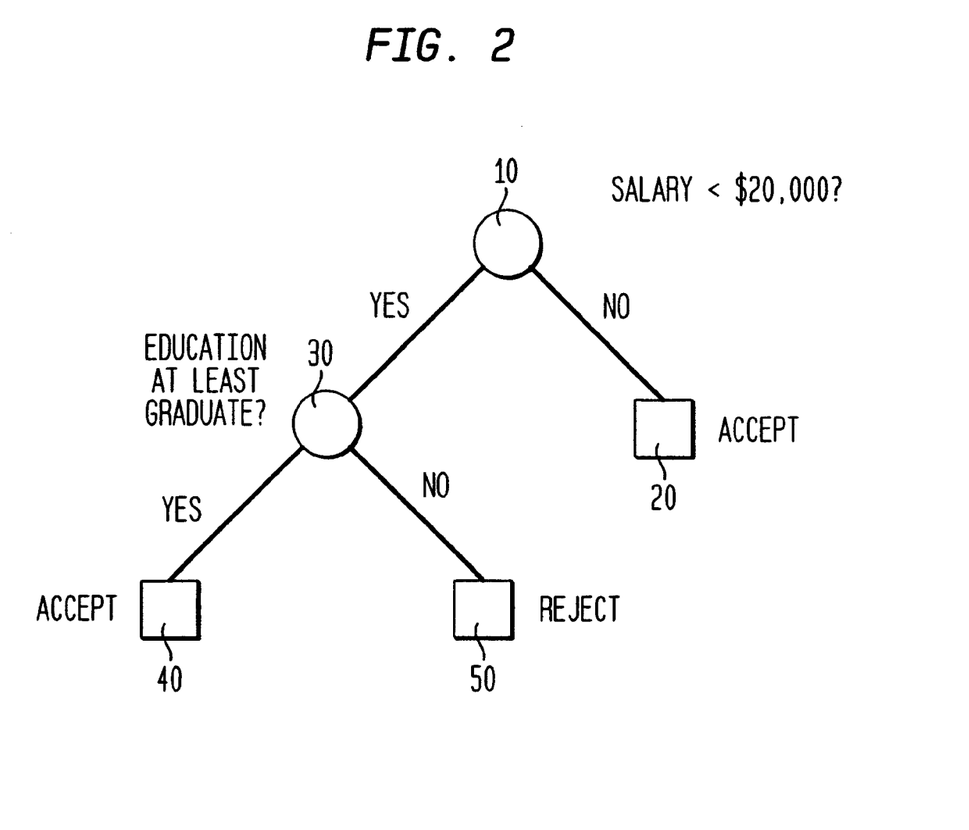
FIG. 2 is an example of a decision tree based on the training set of FIG. 1.

FIG. 2 is an example of a decision tree for the training data in FIG. 1. Each internal node of the decision tree (denoted by a circle in FIG. 2) has a "test" involving an attribute, and an outgoing branch for each possible outcome. For example, at the root node 10 the test is "is the salary level of the applicant less than $20,000.00?" If the answer to this inquiry is "no," the loan application is automatically accepted, ending the inquiry and establishing a "leaf" 20 (a leaf is the ultimate conclusion of a partition after no further inquiry is to be made, and is denoted by a square in FIG. 2)

for the acceptance. Thus, in the example, an applicant who has a salary greater than $20,000 is classified in a class for those applicants who qualify for a loan based on their salary alone.

If the answer to the test at root node 10 is "yes," (e.g., the applicants salary is less than $20,000) further inquiry is made to determine if the applicant can pass the test at internal node 30, namely "does the applicant possess at least a graduate level of education?" If the answer to this inquiry is "yes," then the loan is accepted, even though the salary level of the applicant is below the $20,000 threshold, and a leaf 40 is established for the acceptance. This places the applicant in a class comprising applicants who do not qualify for a loan based on salary but who do qualify based on their education level.

If the answer to the inquiry at node 30 is "no," then the loan is rejected and a leaf 50 is established for the rejection.

The outcome of the test at an internal node determines the branch traversed and thus the next node visited. The class for the record is simply the class of the final leaf node (e.g., accept or reject). Thus, the conjunction of all the conditions for the branches from the root to a leaf constitute one of the conditions for the class associated with the leaf.

Figure 3:
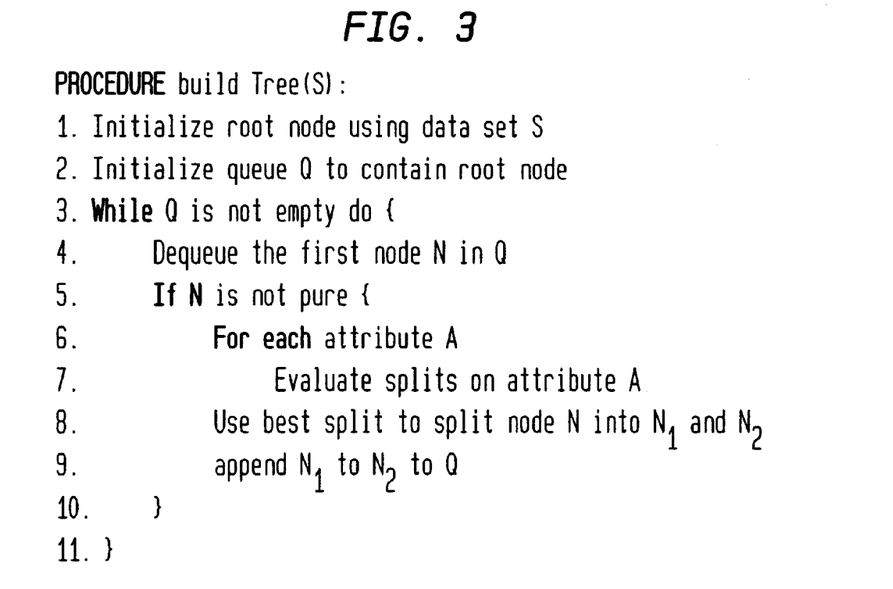
FIG. 3 is an example of an algorithm for building the decision tree of FIG. 2.

An example of an algorithm for building a prior art decision tree is shown in FIG. 3. The root node of the tree is initialized in Step 1, while in Step 2, the queue Q (which keeps track of nodes that still need to be split) is initialized to contain the root node. In the "while" loop spanning steps 3 to 11, nodes in Q are recursively split until there are no further nodes remaining to be split (that is, until Q becomes empty). For each node that can be split, the attribute and split that results in minimum entropy (i.e., the split that can be described in the least number of bits) is determined in steps 6 and 7. The children of the split node are then appended to Q to be split further in Step 9. The algorithm of FIG. 3 is one example of a program for building a decision tree; decision-tree building is a known process and one of ordinary skill in the art could develop numerous other examples of programs for building a decision tree.

The tree is built breadth-first by recursively partitioning the data until each partition is pure, that is, until the classes of all records in the node are identical. The splitting condition for partitioning the data is either of the form A<v if A is a numeric attribute (v is a value in the domain of A) or A∈V if A is a categorical attribute (V is a set of values from A's domain). For example, in the loan application example described with respect to FIGS. 1 and 2, at the first node, the test is "is the applicant's salary less than $20,000?". If we assume that the first applicant has a salary of $15,000, the attribute A=$15,000 and the value V=$20,000. Thus, at root node 10, the condition A<V (i.e., is $15,000<$20,000) yields a YES; thus, the attributes of this first applicant are passed on to the left branch (internal node 30) where an additional test takes place. If the condition A<v resulted in a No answer, the attribute of this applicant would have been passed to the right branch and leaf 20 would have been formed, classifying this applicant in the class of applicants whose loan request is accepted.

Likewise, in the event of a categorical attribute (e.g., education level), if the attribute A of the first applicant is in the set of V (e.g., if the applicant in the loan application example does have at least a graduate level education), then a YES result is achieved and the attributes of this applicant are passed onto leaf 40, which classifies the applicant in the class of those who have not met the salary minimum but have met the education requirement. It is noted that a leaf is formed at node 40 because there are no further conditions that need to be met. If, on the other hand, at node 30 it is determined that the applicant does not possess at least a graduate education (the test "is A in the set of V?") yields a No response), then a leaf at node 50 is established, which is where all applicants who have not met the salary requirement and the education requirement are classified. Thus, each split is binary.

Each node of the decision tree maintains a separate list for every attribute. Each attribute list contains a single entry for every record in the partition for the node. The attribute list entry for a record contains three fields—the value for the attribute in the record, the class label for the record, and the record identifier. Attribute lists for the root node are constructed at the start using the input data, while for other nodes they are derived from their parent's attribute lists when the parent nodes are split. Attribute lists for numeric attributes at the root node are sorted initially and this sort order is preserved for other nodes by the splitting procedure. Also a histogram is maintained at each node that captures the class distribution of the records at the node. Thus, the initialization of the root node in Step 1 of the build algorithm of FIG. 3 involves (1) constructing the attribute lists, (2) sorting the attribute lists for numeric attributes, and (3) constructing the histogram for the class distribution.

For a set of records S, the entropy E(s) equals:

$$\Sigma_j p_j \log p_j$$

where $p_j$ the relative frequency of class j in S. Thus, the more homogeneous a set is with respect to the classes of records in the set, the lower is its entropy. The entropy of a split that divides S with n records into sets $S_1$ with $n_1$ records and $S_2$ with $n_2$ records is $$E(S_1, S_2) = \frac{n_1}{n} E(S_1) + \frac{n_2}{n} E(S_2).$$

Consequently, the split with the least entropy best separates classes, and is thus chosen as the best split for a node.

To compute the best split point for a numeric attribute, the (sorted) attribute list is scanned from the beginning and for each split point, and the class distribution in the two partitions is determined using the class histogram for the node. The entropy for each split point can thus be efficiently computed since the lists are stored in a sorted order. For categorical attributes, the attribute list is scanned to first construct a histogram containing the class distribution for each value of the attribute. This histogram is then utilized to compute the entropy for each split point.

Once the best split for a node has been found, it is used to split the attribute list for the splitting attribute amongst the two child nodes. Each record identifier along with information about the child node that it is assigned to (left or right) is then inserted into a hash table. The remaining attribute lists are then split using the record identifier stored with each attribute list entry and the information in the hash table. Class distribution histograms for the two child nodes are also computed during this step.

2. Pruning Phase

To prevent overfitting, the MDL principle can be applied to prune the tree built in the growing phase and make it more general.

First, the cost of encoding the data records must be determined. If it is assumed that a set S contains n records, each belonging to one of k classes, with $n_i$ being the number of records n with class i, the cost of encoding the classes for the n records is given by the equation:

$$\log\binom{n+k-1}{k-1} + \log\frac{n!}{n_1!\ldots n_k!}$$

In the above equation, the first term is the number of bits to specify the class distribution, that is, the number of records with classes 1 ... k. The second term is the number of bits required to encode the class for each record once it is known that there are $n_i$ records with class label i. The above equation is not very accurate when some values of the $n_i$ records are either close to zero or close to n. Thus, a better equation for determining the cost C(S) of encoding the classes for the records in set S is:

$$C(S) = \sum_i n_i \log\frac{n}{n_i} + \frac{k-1}{2}\log\frac{n}{2} + \log\frac{\pi^{k/2}}{\Gamma(k/2)} \qquad \text{Equation 1}$$

In Equation 1, the first term is simply n*E(S), where E(S) is the entropy of the set S of records. Also, since k≦n, the sum of the last two terms is always non-negative. This property is used in the present invention when computing a lower bound on the cost of encoding the records in a leaf, as discussed more fully below.

Next, the cost of encoding the tree must be determined. The cost of encoding the tree comprises three separate costs:
1. The cost of encoding the structure of the tree;
2. The cost of encoding for each split, the attribute and the value for the split; and
3. The cost of encoding the classes of data records in each leaf of the tree.

The structure of the tree can be encoded by using a single bit in order to specify whether a node of the tree is an internal node (1) or leaf (0). Thus, assuming that the left branches are "grown" first, the bit string 11000 encodes the tree in FIG. 2.

The cost of encoding each split involves specifying the attribute that is used to split the node and the value for the attribute. The splitting attribute can be encoded using log a bits (since there are a attributes), while specifying the value depends on whether the attribute is categorical or numeric. If it is assumed that v is the number of distinct values for the splitting attribute in records at the node, if the splitting attribute is numeric, then since there are v−1 different points at which the node can be split, log (v−1) bits are needed to encode the split point. On the other hand, for a categorical attribute, there are $2^v$ different subsets of values of which the empty set and the set containing all the values are not candidates for splitting. Thus, the cost of the split is log ($2^v$−2). For an internal node N, the cost of describing the split ($C_{split}$) is $C_{split}(N)$. The cost of encoding the data records in each leaf is as described in Equation (1).

Figure 4:
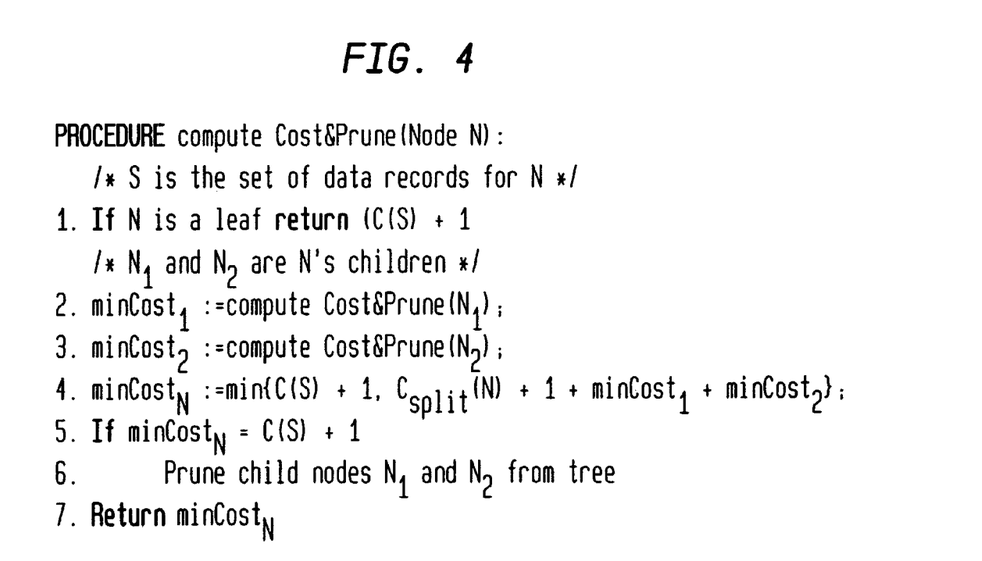
FIG. 4 is an example of an algorithm for computing the minimum cost subtree of a decision tree.

The simple recursive algorithm in FIG. 4 computes the minimum cost subtree rooted at an arbitrary node N and returns its cost. Let S be the set of records associated with N. If N is a leaf, then the minimum cost subtree rooted at N is simply N itself. Furthermore, the cost of the cheapest subtree rooted at N is C(S)+1 (since 1 bit is required in order to specify that the node is a leaf).

If N is an internal node in the tree with children $N_1$ and $N_2$, then there are the following two choices for the minimum cost subtree: (1) the node N itself with no children (this corresponds to pruning its two children from the tree, thus making node N a leaf), or (2) node N along with children $N_1$ and $N_2$ and the minimum cost subtrees rooted at $N_1$ and $N_2$. Of the two choices, the one with the lower cost results in the minimum cost subtree for N.

The cost for choice (1) is C(S)+1. In order to compute the cost for choice (2), in Steps 2 and 3 of FIG. 4, the procedure recursively invokes itself in order to compute the minimum cost subtrees for its two children. The cost for choice (2) is then $C_{split}(N)$+1 +minCost$_1$+minCost$_2$. Thus, the cost of the cheapest subtree rooted at N is given by minCost$_N$ as computed in Step 4 of FIG. 4. Note that if choice (1) has a smaller cost, then the children of node N must be pruned from the tree. Or stated alternately, children of a node N are pruned if the cost of directly encoding the data records at N does not exceed the cost of encoding the minimum cost subtree rooted at N.

PROBLEMS WITH THE PRIOR ART

As noted above, each of the prior art classification methods have two distinct phases, a building (or growing) phase followed by a pruning phase. Prior art methods for generating decision trees perform the pruning phase only after the entire tree has been generated in the initial building phase. Using these prior art methods, the pruning phase prunes large portions of the original tree—in some cases as high as 90% of the nodes in the tree. A substantial effort is wasted in the building phase on growing portions of the tree that are subsequently pruned in the pruning phase.

SUMMARY OF THE INVENTION

The present invention improves the speed and accuracy of prior art classification methods by determining, while the building phase is in progress, which nodes will be pruned and performing the pruning process while the decision tree is being built. This avoids the computational and I/O overhead involved in processing the nodes, realizing significant improvements in performance.

The present invention accomplishes the above using a method of data classification involving the generation of a decision tree by building and pruning the decision tree, the improvement comprising determining, during the building process, which nodes of the decision tree are appropriate for pruning; and pruning, during the building process, those nodes deemed appropriate for pruning.

The determining step can include the steps of computing the minimum cost of subtrees of yet to be expanded nodes; computing the minimum cost of encoding the subtrees at existing internal nodes using the computed minimum cost of subtrees of yet to be expanded nodes; and immediately pruning those subtrees at the internal node for which the computed minimum cost of the subtree is greater than the cost of encoding the internal n ode itself.

In a first embodiment, the step of computing the minimum cost of subtrees of yet to be expanded nodes is based on the cost of the node in which the subtree is rooted.

In a second embodiment the step of computing the minimum cost of subtrees of yet to be expanded nodes is based on cost of the node in which the subtree is rooted and the cost of any splits associated with that node.

In a third embodiment, the step of computing the minimum cost of subtrees of yet to be expanded nodes is based on the cost of the node in which the subtree is rooted, the cost of any splits associated with that node, and the cost of encoding the split value of any splits associated with that node.

DETAILED DESCRIPTION OF THE PREFERRED EMBODIMENT

According to the present invention, periodically or after a certain number of nodes are split (this is a user-defined parameter), the partially built tree is pruned. In accordance with the present invention the prior art MDL-based pruning method is utilized. However, in contrast to the prior art methods in which the cost of building the tree is determined after all nodes have been expanded, during the building phase the minimum cost of subtrees rooted at leaf nodes that can still be expanded is computed. With the computation of the minimum subtree cost at nodes, the nodes pruned are a subset of those that would have been pruned anyway during the pruning phase, and they are pruned while the tree is still being built. A pruning algorithm for achieving this method, illustrated in FIG. 5, is based on this minimum subtree-cost strategy for the cost of the cheapest subtree rooted at a "yet to be expanded" leaf node.

The pruning method of the present invention distinguishes among three kinds of leaf nodes. The first kind of leaves are those that still need to be expanded. For such leaves, a minimum (lower bound) on the cost of subtrees at the leaves is determined. The two other kinds of leaf nodes consist of those that are either a result of pruning or those that cannot be expanded any further (because they are pure).

For such leaves, the usual cost of C(S)+1 is used, just as in the prior art. Thus, the pruning procedure for the second and third kind of leaf nodes is similar to the earlier procedure illustrated in FIG. 4; however, the cost for the cheapest subtree at leaf nodes that have not yet been expanded may not be C(S)+1 and thus the prior art procedure cannot be used for the first type of leaf nodes. Also, when children of a node N are pruned, all its descendants are removed from the queue maintained in the build procedure—this ensures that they are not expanded by the build procedure.

Figure 5:
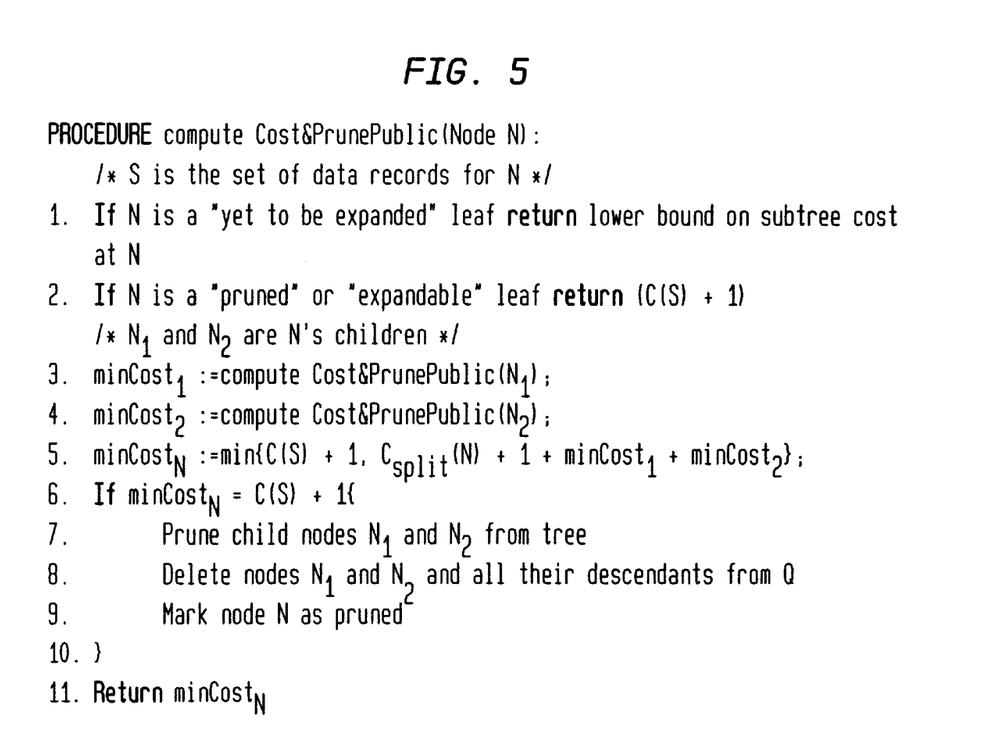
FIG. 5 is an example of a pruning algorithm which can be used to prune a decision tree during the building stage in accordance with the present invention.

According to the present invention, a modified pruning algorithm such as that shown in FIG. 5 is invoked from the build procedure periodically (e.g., after each level of nodes has been built) on the root of the partially built tree. Once the building phase ends, there are no leaf nodes belonging to the "yet to be expanded" category.

Applying the pruning algorithm of FIG. 5 at the end of the building phase has the same effect as applying the prior art pruning algorithm and results in the same pruned tree as would have resulted using the prior art pruning algorithm. However, the prior art pruning procedure of FIG. 4 will only work when the tree is completely built, since the calculation of the cheapest subtree rooted at a leaf is based on the formula C(S)+1. The leaf of a tree that is partially built may turn into an internal node if it subsequently splits upon the introduction of new data. The cost of a subtree rooted at N could be a lot less than C(S)+1 as a result of the splitting. Thus, using C(S)+1 as the estimated cost may overestimate the cost of the cheapest subtree rooted at N and this could result in overpruning.

In a first embodiment of the present invention, since any subtree rooted at a node N must have a cost of at least 1, 1 is a simple but conservative estimate for the minimum cost of the subtree at leaf nodes that are "yet to be expanded". Using this simple estimate the number of nodes generated is substantially reduced.

Since more accurate estimates can enable the pruning of even more nodes, two additional embodiments for computing better and higher estimates for the minimum cost subtrees at leaf nodes are also disclosed. As mentioned before, in accordance with the present invention, the costs at leaf nodes is underestimated (i.e., a minimum cost is computed) to prevent over-pruning. A second embodiment of the present invention is described with references to FIGS. 6, 7, and 8 and the following THEOREM 1:

THEOREM 1: The cost of any subtree with s splits and rooted at node N is at least $2 * s + 1 + s * \log\alpha + \Sigma_{i=s+2}^{k} n1$ The second embodiment takes into account split costs when computing a lower bound on the cost of the cheapest subtree rooted at a "yet to be expanded" leaf node N. Specifically, for values of $s \leq 0$, a lower bound is computed on the cost of subtrees rooted at N and containing s splits (and consequently, s internal nodes). The cost estimate for the cheapest subtree at node N is then set to the minimum of the lower bounds computed for the different s values. This guarantees that the use of this embodiment computes the cost of the cheapest subtree rooted at N.

As an example of the above method, consider a database with two attributes, age and car type. The age attribute is a numeric attribute and the car type attribute is categorical, with domain (e.g., family, truck, sports, etc.). Each record has a class label that is one of "low," "medium," or "high," indicating the risk level for the driver. Assume that a "yet to be expanded" leaf node N contains the set S of data records shown in FIG. 6.

Figure 7:
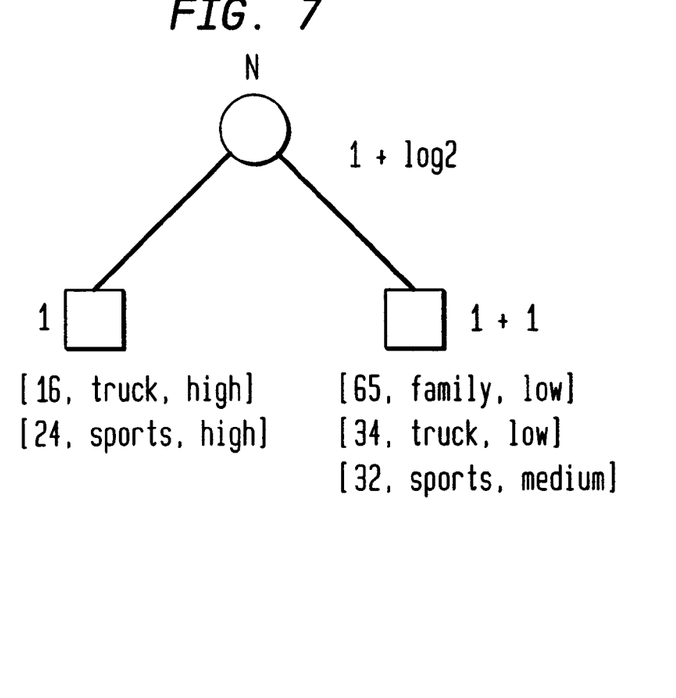
FIG. 7 is an example of a 1-split decision tree based on the data records of FIG. 6.
Figure 8:
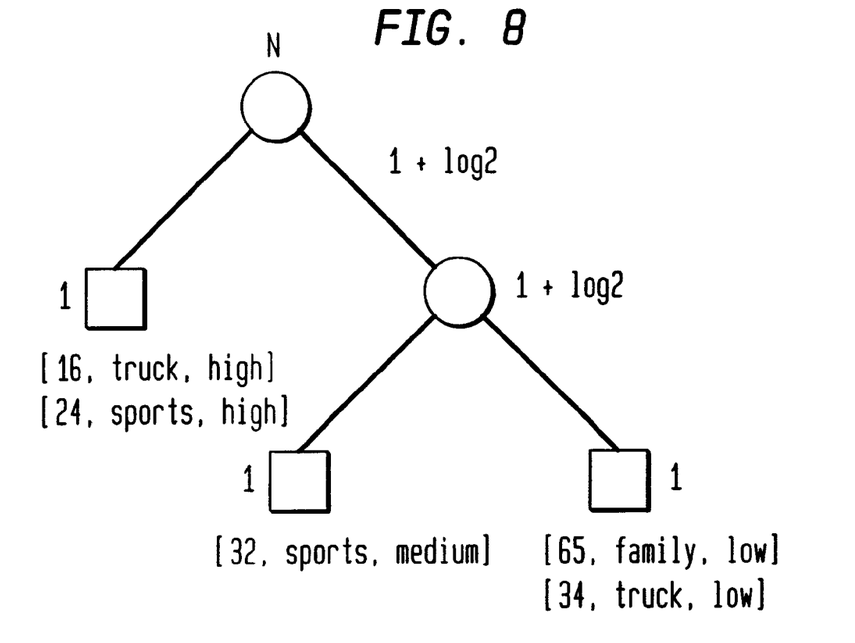
FIG. 8 is an example of a 2-split decision tree based on the data records of FIG. 6.

The minimum cost subtrees at N with 1 and 2 splits are as shown in FIGS. 7 and 8, respectively. The minimum cost for encoding each node is presented next to the node in FIGS. 7 and 8 as are the records for each leaf node. Each node has a cost of 1 for encoding its type. In addition, each internal node has an additional cost of log 2 for specifying the splitting attribute. Further, in FIG. 7, the second leaf node contains a record with class "medium" which is different from the class for the first leaf, and it thus has an extra cost of at least 1. The remaining leaf nodes in both subtrees are all pure nodes and so do not incur any additional costs, e.g., they have a cost of 1.

The minimum cost of each subtree is the sum of the minimum costs for all the nodes. Thus, a lower bound on subtrees with 1 split is 5, while for subtrees with 2 splits, it is 7 which are identical to the lower bounds for the subtree costs due to Theorem 1 indicating that the lower bounds determined are fairly accurate.

Theorem 1 gives a lower bound on the cost of any subtree with s splits and can be used to estimate the cost for the minimum cost subtree rooted at a node N. Note that when the number of splits considered increases from s to s+1, the minimum subtree cost increases by 2+log a and decreases by $n_{s+2}$.

Thus, it is only necessary to compute, using the result of Theorem 1, the minimum cost for subtrees rooted at N with $0 \ldots k-1$ splits and set the cost estimate to be the minimum of all these costs. The reason for only considering up to $k-1$ splits is that beyond $k-1$ splits, the subtree cost does not reduce any further. This is because the last term in Theorem 1 (which is the sum of the number of records of the $k-s-1$ smallest classes) becomes 0 for $k-1$ splits and cannot decrease any further, while the other terms keep increasing with the number of splits.

In addition, if for a certain number s of splits, it is the case that $n_{s+2} \leq 2+\log a$, then it is not necessary to consider subtrees with splits greater than s. The reason for this is that when s increases and becomes s+1, the minimum subtree cost increases by a fixed amount which is 2+log a while it decreases by $n_{s+2}$. Thus, since $n_i \geq n_{i+1}$, increasing S further cannot cause the minimum subtree cost to decrease any further.

Figure 9:
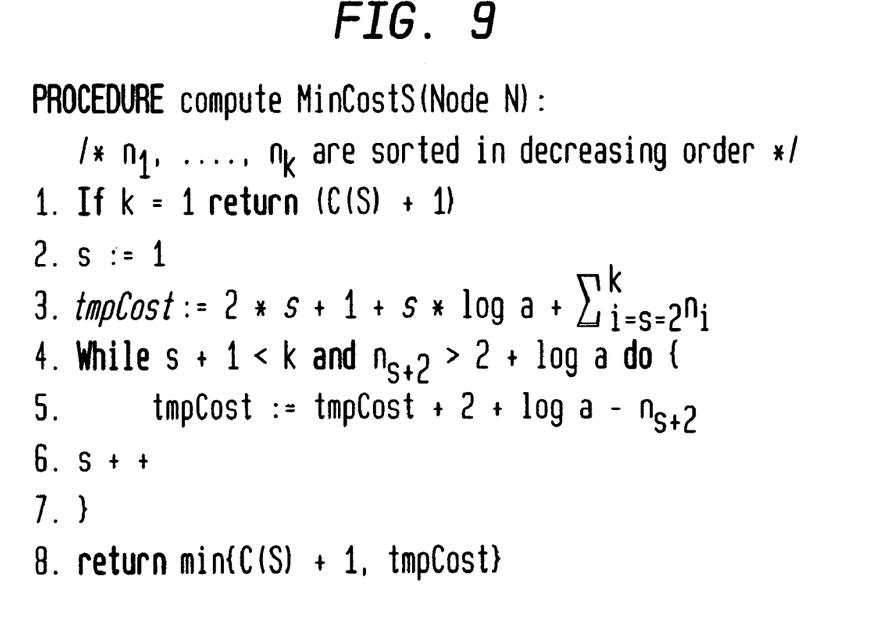
FIG. 9 is an example of an algorithm for computing the estimated minimum cost subtree at a "yet to be expanded" node in accordance with a second embodiment of the present invention.

An example of an algorithm for computing the estimate for the minimum cost subtree at a "yet to be expanded" node N in the second embodiment is as shown in FIG. 9. According to this algorithm, the variable tmpCost stores the minimum cost subtree with $s \geq 1$ splits. For s=0, since the bound due to Theorem 1 may be only a rough estimate, the procedure uses C(S)+1 instead. The maximum value considered for s is k-1, and if for an $s, n_{s+2} \leq 2+\log a$, then values larger than s are not considered. The time complexity of the procedure is dominated by the cost of sorting the $n_i$'s in the decreasing order of their values, and is thus, O(k log k).

In the algorithm of FIG. 9, when estimating the cost of a subtree rooted at a "yet to be expanded" node N, the cost of each split is estimated to be log a bits. However, this only captures the cost of specifying the attribute involved in the split. In order to completely describe a split, a value or a set of values is also required for the splitting attribute. This specifies the distribution of records amongst the children of the split node. Thus, in a third embodiment, the cost of each split is estimated with more accuracy by also including the cost of encoding the split value in the cost of each split. Other than including the cost of encoding the split value, this method is essentially the same as estimating the cost of the cheapest subtree rooted at a "yet to be expanded" node N as explained with respect to the second embodiment. For values of $s \geq 0$, a lower bound is computed on the cost of subtrees containing s splits and rooted at N. The minimum of these lower bounds for the various values of s is then chosen as the cost estimate for the cheapest subtree at N. The time complexity of the cost estimation procedure for this embodiment is O(k*(log k+a)).

For a subtree with s splits and rooted at a node N, the cost of specifying the structure of the subtree is 2*s+1, while the cost of encoding the splitting attribute at the internal nodes is s*log a. Compared to the cost for specifying the splitting attribute which requires a fixed number of bits, log a, estimating the cost of split values is a difficult problem. The reason for this is that a lower bound on the cost of a subtree with s splits and rooted at a "yet to be expanded" leaf node N is being computed. As a result, it is not known in advance the splitting attribute for a split node in the subtree—the cost of encoding the split value depends on the splitting attribute. Also, it is difficult to estimate the number of values for the splitting attribute at a split node since the distribution of records at the leaves and the structure of the subtree is unknown. In order to keep the minimum subtree cost estimation procedure computationally efficient, it is assumed that all that is known is that the subtree has s split nodes. In the following subsections, for a subtree with s splits, a lower bound on the cost of encoding the split values of the internal nodes and the cost of describing the records in the leaves is computed.

In order to develop an algorithm in accordance with the third embodiment for computing a lower bound on the cost of encoding the split values and the records in the leaves, a cost model for these must be developed in a specific subtree with s splits and s+1 leaves. This cost model is used to formulate the problem of finding a lower bound in a manner that is independent of the exact distribution of the records in the leaves and the internal structure of the tree (since this is unknown).

To develop the cost model, assume that S is the set of records in node N, and k is the number of classes in N Also, let $S_i$ denote the set of records in S that belong to class i; $n_i=|S_i|$; and $S_{ij}$ be the number of records belonging to class i in leaf j. Note that $|S_{ij}| \leq n_i$. Furthermore, let $c_j$ be the majority class for leaf j and M be the set of majority classes in the s+1 leaves.

Classes not contained in M are a minority in all the leaves. In addition, a class $i \in M$ is a minority in leaves j for which $c_j \neq i$. Thus, using arguments similar to those employed in the proof of Theorem 1, it can be shown that the cost of encoding the records in the leaves is:

$$\sum_{i \notin M} n_i + \sum_{i \in M} n_i - \sum_{j=1}^{s+1} |S_{cij}|$$

Next, regarding the cost of encoding the split values, presume that $V(S_{ij})$ denotes the minimum cost for encoding a split value at the parent of a node containing the set of records $S_{ij}$. A simple observation is that the set of records $S_{ij}$ is contained in every ancestor of leaf j in the subtree. Thus, if leaf j is a descendant of an internal node, then the set of records $S_{ij}$ occur in one of the internal node's children. Since leaf j contains the records in $S_{cij}$, it follows that the cost of specifying a split value at an internal node is greater than or equal to the maximum $V(S_{cij})$ for leaves j that are its descendants.

Figure 10:
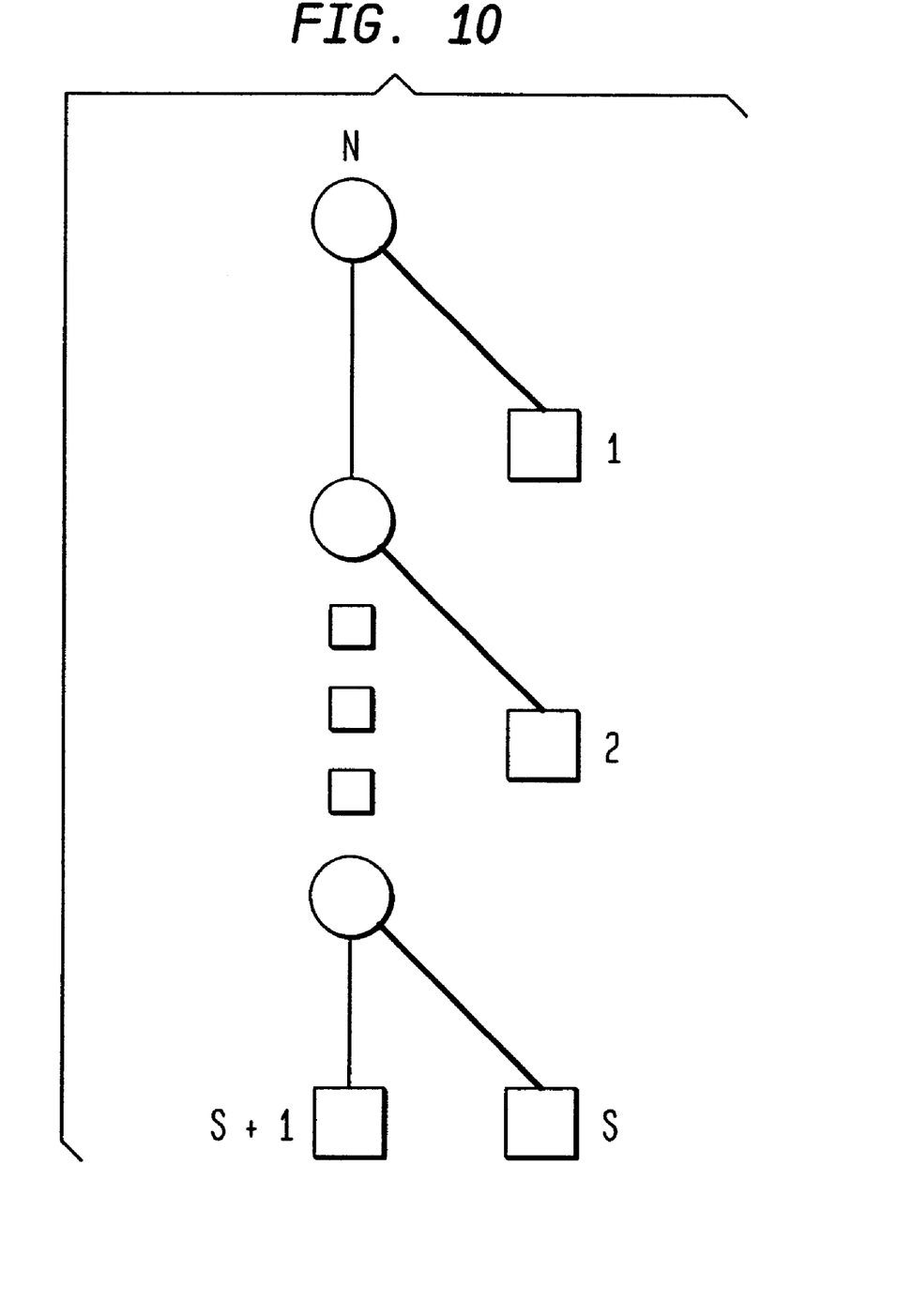
FIG. 10 is an example of a decision tree formed in accordance with the second embodiment.
Figure 11:
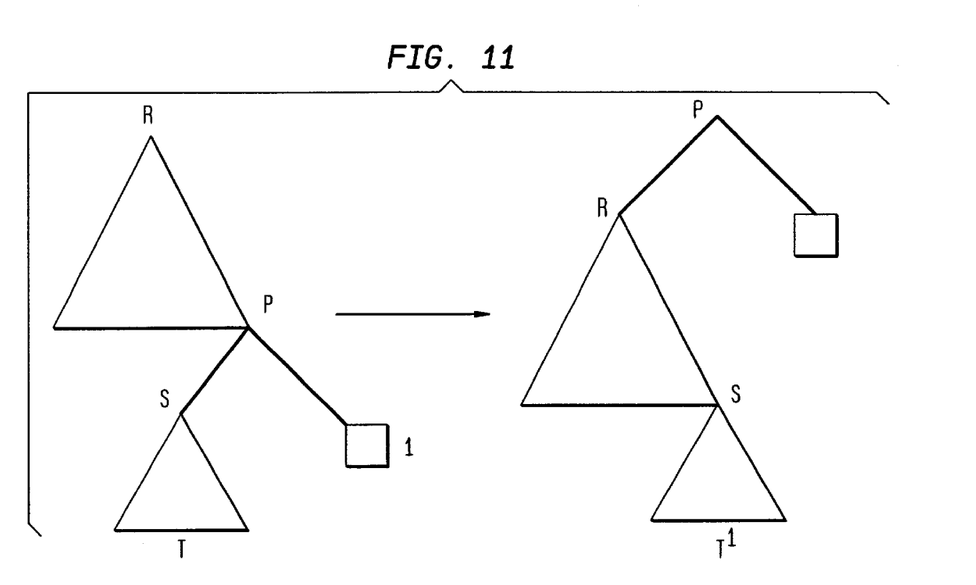
FIG. 11 is an example of a decision tree representing the cost of encoding split values in accordance with the second embodiment.

To compute a lower bound on the cost of specifying split values, it is necessary to determine the tree for which the sum of the costs of encoding split values at its internal nodes is minimum. If it is assumed that $V(S_{c_{l1}}) \geq V(S_{c_{l2}}) \geq \ldots \geq V(S_{c(s+1)s+1})$, then the tree with the least cost for encoding split values at internal nodes is as shown in FIG. 10 and the minimum cost of encoding splits is $\Sigma_i^s V(S_{cij})$. This can be shown using the following simple example. Consider a subtree T with leaves numbered 1 ... s+1 where 1 is the leaf with the maximum value for $V(S_{cij})$. Let T' be the subtree obtained by deleting leaf 1 and its parent from T, and making leaf's parent the root of the resulting tree (see FIG. 11). The cost of encoding split values for T' is no more than that for T. This is because the cost of representing the split value in every ancestor of 1 in T previously does not increases in T' while the cost for other internal nodes remains unchanged. Therefore, using induction with the above observation, it can be shown that the tree in FIG. 10 is a lower bound on the cost of representing split values for subtrees with leaves1 ... s+1 where $V(S_{c l 1}) \geq V(S_{c l 2}) \geq \ldots \geq V(S_{c(s+1)s+1})$ Thus, in general, the cost of encoding the split values at all the internal nodes is at least $$\sum_{j=1}^{s+1} V(S_{cij}) - \min\{V(S_{cij}): 1 \leq j \leq s+1\}.$$

Combining the cost of specifying split values described above with the cost of encoding the records in the leaf nodes (see Equation (2)), the total cost after simplification is at least:

$$\sum_{i=1}^{k} n_1 - \left( \sum_{j=1}^{s+1} |S_{cij}| - V(S_{cij}) \right) + \min\{V(S_{cij}): 1 \leq j \leq s+1\} \quad \text{(Equation 2)}$$

To determine the lower bound on the total cost, the set M of majority classes (these are the $c_j$'s for the s+1 leaves) must be found, and the set of records $S_{cij}$ for them such that the quantity in the following equation is maximized:

$$\sum_{j=1}^{s+1} (|S_{cij}| - V(S_{cij}) + \min\{V(S_{cij}): 1 \leq j \leq s+1\}$$

$V(S_{ij})$ for a set of records $S_{ij}$ must be defined. If $V_A$ is defined as the number of distinct values that occur for attribute A in records belonging to $S_{ij}$, then $V(S_{ij})$ is defined as follows:

$$V(S_{ij}) = \min_A\{v : v = \log(v_A) \text{ if } A \text{ is numeric,} \quad \text{(Equation 3)}$$
otherwise
$v = v_A \text{ (if } A \text{ is categorical)}\}$ If A is the splitting attribute in the parent of a node that contains the set of records $S_{ij}$, then the number of values for attribute A in the parent node must be at least $V_A+1$ (since the sibling node must contain at least one additional value). Thus, if A is numeric, the split value cost with attribute A as the splitting attribute is at least $\log(V_A)$ while if A is categorical, the cost is $\log(2^{v_A+1}-2)$ or at least $V_A$ since $\log(2^{v_A+1}-2) \geq \log(2^{v_A})$ for all $V_A \geq 1$. As a result, in Equation 3, since $V(S_{ij})$ is set to the minimum cost of split values over all the attributes A, the cost of specifying the split value at the parent of a node containing $S_{ij}$ is at least $V(S_{ij})$.

Figure 6:
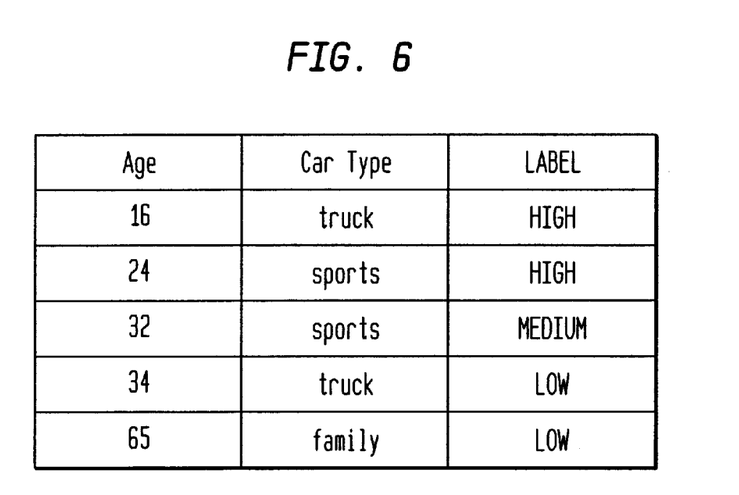
FIG. 6 is a table showing a sample training set of data records for explaining the present invention.
Figure 12:
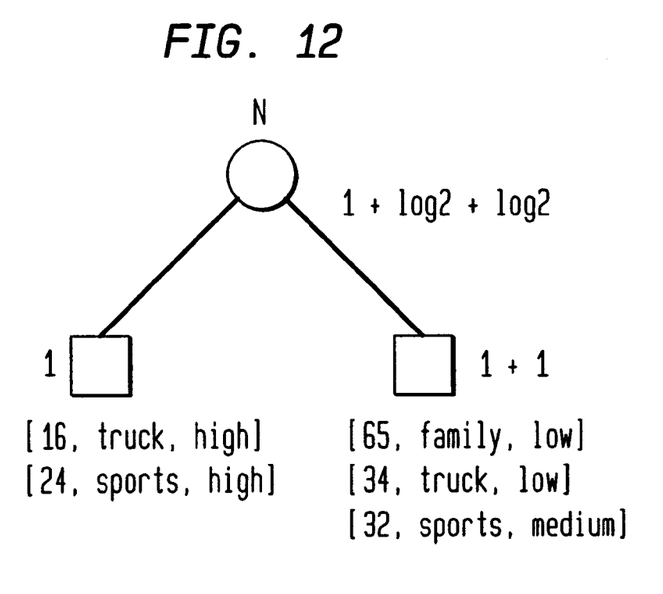
FIG. 12 is an example of a 1-split decision tree based on the data records of FIG. 6 in accordance with a third embodiment of the present invention.
Figure 13:
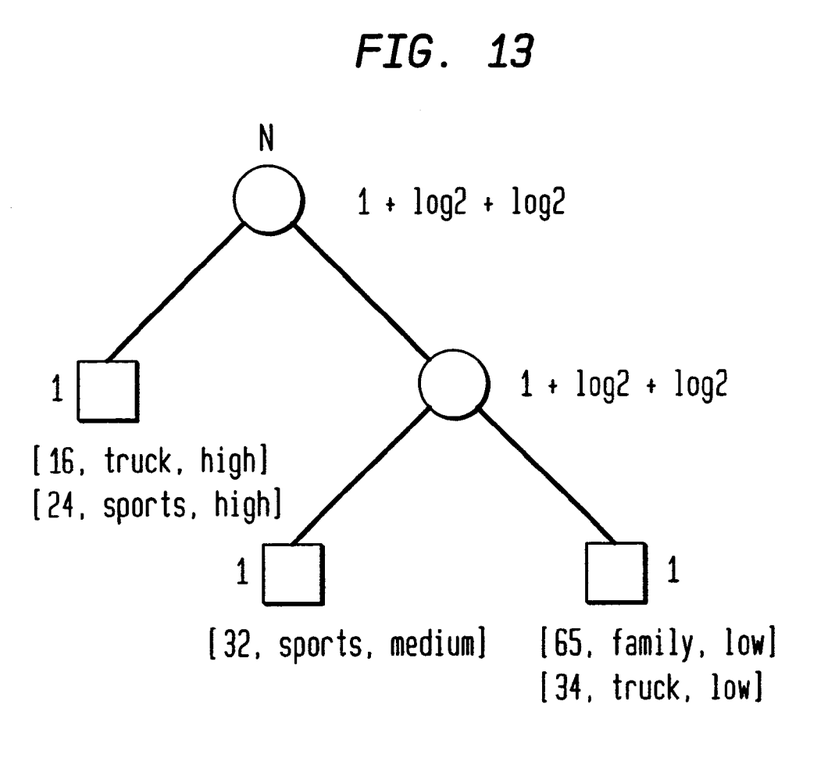
FIG. 13 is an example of a 2-split decision tree based on the data records of FIG. 6 in accordance with the third embodiment.

As an example, consider the node N containing the 5 records described in FIGS. 6, 7 and 8. For the cost model, the minimum cost subtrees at N with 1 and 2 splits are as shown in FIGS. 12 and 13, respectively. Each node has a cost of 1 for encoding its type. In addition, internal nodes have an additional cost of log 2 for specifying the splitting attribute. Further, the second leaf node in FIG. 12 has an additional cost of at least 1 due to the record belonging to class medium. Also, for the subtree in FIG. 12, c1=high and c2=low. Thus, $S_{c1}1$ is the set of records with high class labels. $V(S_{c1}1)$ can be computed as follows. On both the age and the car type attributes, records-in $S_{c1}1$ take 2 values. Since age is numeric and car type is categorical, $V(S_{c1}1)=$ log 2 which is the minimum of log 2 and 2. Similarly, the value of $V(S_{c2}2)$ can also be shown to be log 2. Thus, the cost of encoding splits in the internal node for the subtree in FIG. 12 using the cost model is 1+log 2+log 2.

The cost of each subtree is the sum of the costs for all the nodes. Thus, a lower bound on the cost of subtrees with one split is 6, while for subtrees with two splits, it is 9. These bounds are higher and thus more accurate than the bounds computed previously with respect to FIGS. 6 and 7 and 8 that only considered the cost of describing splitting attributes and not the cost of encoding split values.

The minimum cost of encoding the records and split values in a subtree with s splits can be found by computing the minimum possible value for Equation (3). This is equivalent to computing a set M of majority classes such that Equation (4) is maximized. Two possible cases need to be considered: (1) each class is a majority class in at most one leaf, and (2) at least one class is a majority class in multiple leaves.

For subtrees in which a class can be a majority class in at most one leaf, the majority classes $c_j$ for the leaves are distinct and M contains s+1 classes. The following lemma states the properties of classes in the set M that maximizes the value of Equation (4):

Lemma 1: For subtrees in which no two leaves contain the same majority class, for every class $c_j$ in set M, the value of Equation (4) is maximized when $S_{cj}j=S_{cj}$.

Thus, due to the Lemma 1, the optimal value for $S_{cj}j$ is $S_{cj}$, the set of all records belonging to class $c_j$ in set S. As a result, for subtrees at node N with s splits and with no two leaves containing the same majority class, a lower bound on the cost of encoding split values and records in the leaves can be obtained by finding the set M containing s+1 classes such that $\Sigma_{i \in M}(n_i - V(S_i)) + \min\{V(S_i): i \in M\}$ is maximized.

Figure 14:
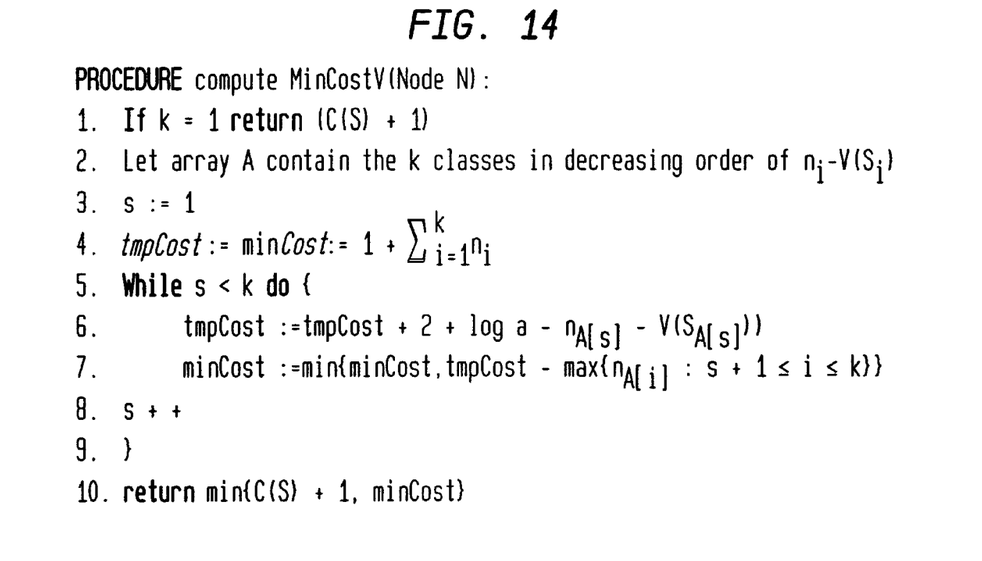
FIG. 14 illustrates an example of an algorithm for computing the minimum cost of a subtree rooted at a "yet to be expanded" node and having no two leaves with the same majority class.

FIG. 14 illustrates an algorithm for computing the minimum cost for a subtree rooted at a "yet to be expanded" leaf node N and having no two leaves with the same majority class. The estimate computed by this algorithm is at least as good as that computed by the algorithm of the second embodiment, and in many cases, better. For subtrees in which a class is a majority class in more than one leaf, the algorithm for computing a lower bound on the cheapest subtree is presented in FIG. 15. The lower bound on the subtree cost is thus the minimum of the two computed lower bounds.

Due to Equation (2), for the case of subtrees with s splits and each leaf with a different majority class, a lower bound on the cost is $$2*s+1+s*\log a + \sum_{i}^{k} = 1^n i - (\Sigma i \in M(^n i - V(S_i)) + \min\{V(S_i): i \in M\}),$$

where M is a set of s+1 classes for which $\Sigma i \in M(^n i - V(S_i)) + \min\{V(S_i): i \in M\}$ is maximized. Assuming that array A is as defined in Step 2 of the algorithm, in the following, we show that $$\sum_{i}^{s} = 1(^{n}A[i] - V(SL([i])) + \max\{nA[i]: s+1 \le i \le k\}$$

exceeds the maximum possible value for $\Sigma i \epsilon M(ni-V(S_i))+\min\{V(S_i):i\epsilon M\}$) and can thus be used in its place to compute the lower bound for the subtree with s splits.

Figure 15:
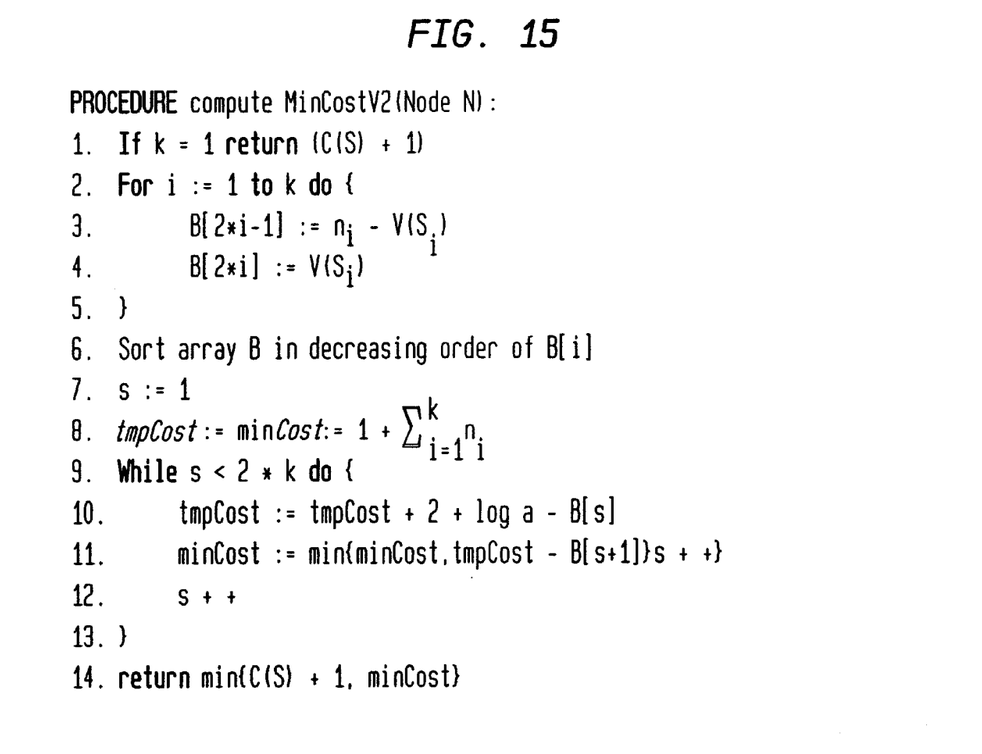
FIG. 15 illustrates an example of an algorithm for computing the minimum cost of a subtree rooted at a "yet to be expanded" node in which a class is a majority class in more than one leaf.

In the algorithm in FIG. 15, for a given s, tmpcost stores the quantity $$2*s + 1 + s*\log a + \sum_{i}^{k} = 1^n i - \sum_{i}^{s} = 1(nA[i] - V(SL[i])),$$

and thus the minimum cost for a subtree with s splits can be obtained by subtracting max{nA[i]:s+1≦i≦k} from tmpcost. Note that it is only necessary to contain subtrees with less than k splits, since for trees with k or greater splits, a pair of leaves would be forced to contain the same majority class. Thus, the minimum cost for a subtree can be found by computing minimum costs for subtrees with 1 through k) −1 splits and taking the lowest among them (variable mincost in the algorithm is used to keep track of this).

The complexity of the estimation procedure is dominated by the costs of computing V(Si) for the classes, and the cost of sorting array A. The V(Si)'s for the k classes can be computed when attribute lists for a node are split and requires time O(ka), while the sorting can be accomplished in time O(k log k). Note that the quantity max {nA[i]:s+1≦i≦k for each s can be precomputed for array A in O(k) time by performing a single reverse scan of A.

Figure 16:
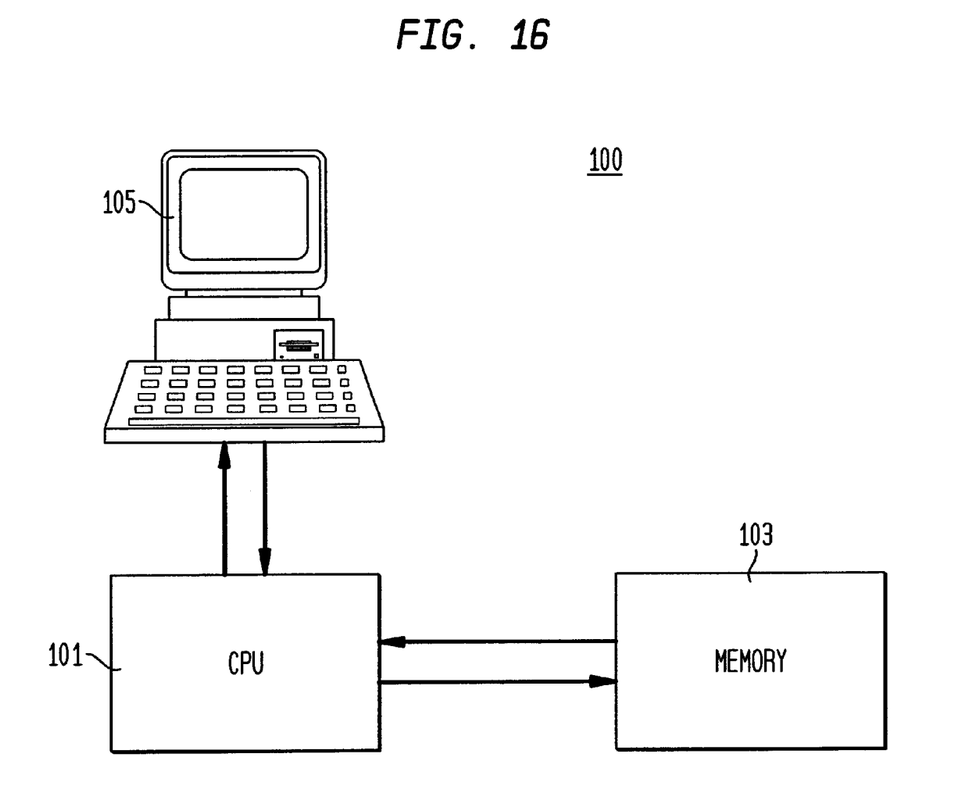
FIG. 16 illustrate a system diagram of the present invention.

FIG. 16 illustrates a computer system 100 which provides a structure for carrying out the present invention. The system 100 includes a central processor unit (CPU) 101, memory 103, and a user interface 105. The user interface 105 may comprise traditional equipment such as a monitor and printer for displaying information for the user and a keyboard and mouse for entering information, as well as other peripherals such as scanners, voice recognition systems, and touch screens. The system 100 can be configured to accommodate traditional user interfaces and it is anticipated to be compatible with future interfaces as well.

Memory 103 is operatively connected to CPU 101. Memory 103 contains a program of instructions for the system 100 to perform the process of the present invention as described above. Memory 103 can be any known memory medium such as RAM or PROM. The program of instructions may be integral to the system of the present invention or a discrete aspect of the present invention. The program may be adapted to function on known operating platforms and is anticipated to be compatible with emerging operating platforms as well. The program may be stored on any computer-readable medium such as a disk, tape, CD ROM, RAM or PROM.

While there has been described herein the principles of the invention, it is to be understood by those skilled in the art that this description is made only by way of example and not as a limitation to the scope of the invention. Accordingly, it is intended by the appending claims, to cover all modifications of the invention which fall within the true spirit and scope of the invention.

I claim:

1. In a method of data classification involving the generation of a decision tree by building and pruning the decision tree, the improvement comprising:

determining, during the building process, which nodes of the decision tree are appropriate for pruning; and pruning, during the building process, those nodes deemed appropriate for pruning.

2. A method as set forth in claim 1, wherein said determining step includes the steps of:

computing the minimum cost of subtrees of yet to be expanded nodes;

computing the minimum cost of encoding the subtrees at existing internal nodes using the computed minimum cost of subtrees of yet to be expanded nodes; and immediately pruning those subtrees at the internal node for which the computed minimum cost of the subtree is greater than the cost of encoding the internal node itself.

3. A method as set forth in claim 2, wherein said step of computing the minimum cost of subtrees of yet to be expanded nodes is based on the cost of the node in which the subtree is rooted.

4. A method as set forth in claim 2, wherein said step of computing the minimum cost of subtrees of yet to be expanded nodes is based on cost of the node in which the subtree is rooted and the cost of any splits associated with that node.

5. A method as set forth in claim 2, wherein said step of computing the minimum cost of subtrees of yet to be expanded nodes is based on the cost of the node in which the subtree is rooted, the cost of any splits associated with that node, and the cost of encoding the split value of any splits associated with that node.

6. A method of generating a decision tree classifier from a training set of records, each record having at least one numeric attribute and a class label of a class to which the record belongs, the method comprising the steps of:

presorting the records based on the numeric attribute;

generating an attribute list for each attribute and a class list, each entry of the class list corresponding to a class label, the attribute list including values of the attribute and indices to the class label;

building a decision tree from the pre-sorted records, attribute lists, and class list, using a breadth-first process, the decision tree having a root node, a plurality of interior nodes, and a plurality of leaf nodes, the breadth first process being such that the nodes of a same depth from the root node are formed in parallel; and periodically pruning the decision tree during the building process based on a Minimum Description Length (MDL) scheme to obtain the decision tree classifier, the MDL scheme encoding the decision tree as a model such that an encoding cost for describing the decision tree and the training set is minimized taking into account the encoding cost in the pruning.

7. A method as set forth in claim 6, wherein said periodic pruning step includes the steps of:

computing the minimum cost of subtrees of yet to be expanded nodes;

computing the minimum cost of encoding the subtrees at existing internal nodes using the computed minimum cost of subtrees of yet to be expanded nodes; and immediately pruning those subtrees at the internal node for which the computed minimum cost of the subtree is greater than the cost of encoding the internal node itself.

8. A method as set forth in claim 7, wherein said step of computing the minimum cost of subtrees of yet to be expanded nodes is based on the cost of the node in which the subtree is rooted.

9. A method as set forth in claim 7, wherein said step of computing the minimum cost of subtrees of yet to be expanded nodes is based on cost of the node in which the subtree is rooted and the cost of any splits associated with that node.

10. A method as set forth in claim 7, wherein said step of computing the minimum cost of subtrees of yet to be expanded nodes is based on the cost of the node in which the subtree is rooted, the cost of any splits associated with that node, and the cost of encoding the split value of any splits associated with that node.

11. A method of data classification, comprising the steps of:
building a decision tree based on the data to be classified;
determining, during the building step, which nodes of the decision tree are appropriate for pruning; and
pruning said decision tree prior to completion of the building process.

12. A method as set forth in claim 11, wherein said determining step includes the steps of:
computing the minimum cost of subtrees of yet to be expanded nodes of said decision tree;
computing the minimum cost of encoding the subtrees at existing internal nodes using the computed minimum cost of subtrees of yet to be expanded nodes; and
immediately pruning those subtrees at the internal node for which the computed minimum cost of the subtree is greater than the cost of encoding the internal node itself.

13. A method as set forth in claim 12, wherein said step of computing the minimum cost of subtrees of yet to be expanded nodes is based on the cost of the node in which the subtree is rooted.

14. A method as set forth in claim 12, wherein said step of computing the minimum cost of subtrees of yet to be expanded nodes is based on cost of the node in which the subtree is rooted and the cost of any splits associated with that node.

15. A method as set forth in claim 12, wherein said step of computing the minimum cost of subtrees of yet to be expanded nodes is based on the cost of the node in which the subtree is rooted, the cost of any splits associated with that node, and the cost of encoding the split value of any splits associated with that node.

16. A computer system for classifying data by generating a decision tree, said computer system comprising:
a CPU;
a user interface operatively connected to said CPU; and
memory operatively connected to said CPU, said memory containing instructions for instructing said CPU to perform the following steps:
building a decision tree based on the data to be classified;
determining, during the building step, which nodes of the decision tree are appropriate for pruning; and
pruning said decision tree prior to completion of the building process.

17. A computer system as set forth in claim 16, said memory further containing instructions for instructing the CPU to perform the following steps:
computing the minimum cost of subtrees of yet to be expanded nodes of said decision tree;
computing the minimum cost of encoding the subtrees at existing internal nodes using the computed minimum cost of subtrees of yet to be expanded nodes; and
immediately pruning those subtrees at the internal node for which the computed minimum cost of the subtree is greater than the cost of encoding the internal node itself.

* * * * *